(12) United States Patent
Miura

(10) Patent No.: US 8,619,284 B2
(45) Date of Patent: Dec. 31, 2013

(54) METHOD AND APPARATUS FOR INCLUDING CONVERTED DRAWING COMMANDS IN A PRINT DATA FILE

(75) Inventor: Ken Miura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 891 days.

(21) Appl. No.: 12/393,172

(22) Filed: Feb. 26, 2009

(65) Prior Publication Data

US 2009/0237719 A1  Sep. 24, 2009

(30) Foreign Application Priority Data

Mar. 18, 2008  (JP) ................................ 2008-069380

(51) Int. Cl.
*G06F 3/12* (2006.01)
(52) U.S. Cl.
USPC ........ 358/1.15; 358/1.13; 358/1.16; 382/242; 715/202; 715/234; 715/239
(58) Field of Classification Search
USPC ............... 358/1.1, 1.11, 1.13, 1.15, 1.16, 1.9, 358/3.01; 345/418, 442, 467; 365/185.33; 370/229; 382/239, 242; 704/214; 707/693; 710/53; 715/202, 234, 239; 717/110, 111; 725/133
See application file for complete search history.

(56) References Cited

U.S. PATENT DOCUMENTS

| | | | | |
|---|---|---|---|---|
| 5,557,798 A | * | 9/1996 | Skeen et al. | 705/35 |
| 5,832,126 A | * | 11/1998 | Tanaka | 382/239 |
| 5,907,710 A | * | 5/1999 | Furukawa et al. | 717/143 |
| 6,339,424 B1 | | 1/2002 | Ishikawa et al. | |
| 6,369,909 B1 | * | 4/2002 | Shima | 358/1.15 |
| 6,674,435 B1 | * | 1/2004 | Payne et al. | 345/442 |
| 6,859,465 B1 | * | 2/2005 | Colban | 370/506 |
| 2005/0223309 A1 | * | 10/2005 | Lee et al. | 715/500.1 |
| 2005/0264657 A1 | * | 12/2005 | Adams et al. | 348/231.99 |

FOREIGN PATENT DOCUMENTS

| | | | |
|---|---|---|---|
| JP | 09305347 | A | 11/1997 |
| JP | 11147335 | A | 6/1999 |
| JP | 2001043052 | A | 2/2001 |
| JP | 2005-301393 | A | 10/2005 |
| JP | 2007216434 | A | 8/2007 |

* cited by examiner

*Primary Examiner* — King Poon
*Assistant Examiner* — David S Cammack
(74) *Attorney, Agent, or Firm* — Panitch Schwarze Belisario & Nadel LLP

(57) ABSTRACT

A printing system according to the invention includes an image processing apparatus having an editing unit for editing document data into description language data interpretable to a terminal apparatus, an extracting unit for extracting a portion of the description language data as extracted data based on the conversion table for converting a preset command, a converting unit for converting the extracted data to converted data based on the conversion table, and a producing unit for producing transmission data by adding the converted data in a command format to the description language data and includes an image forming apparatus for printing images based the converted transmission data upon removing the comment format. The printing system can reduce a load on the side of the image forming apparatus.

11 Claims, 17 Drawing Sheets

FIG. 4

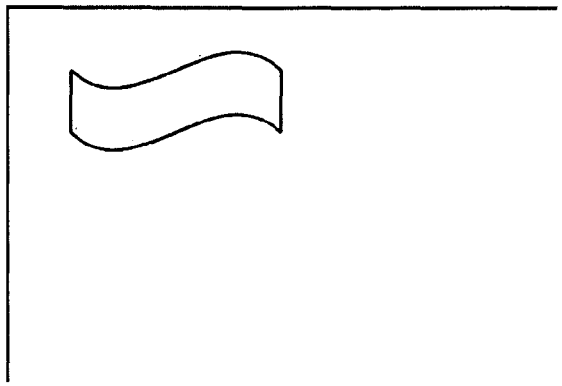

FIG. 5

```
<FixedPage Width="794" Height="1122" xml:lang="en-US"
          xmlns="http://schemas.microsoft.com/xps/2005/06" >
  <Path Stroke="#000000" RenderTransform="1 0 0 1 20 -60">
    <Path.Data>
      <PathGeometry>
        <PathFigure StartPoint="0, 100" >
          <PolyLineSegment Points="0, 80"/>
          <PolyBezierSegment Points="20, 100 40, 60 60, 80" />
          <PolyLineSegment Points="60, 100 " />
          <PolyBezierSegment Points="40, 80 20, 120 0, 100 " />
        </PathFigure>
      </PathGeometry>
    </Path.Data>
  </Path>
</FixedPage>
```

FIG.6

| ELEMENT NAME | DESCRIPTION | ATTRIBUTE |
|---|---|---|
| FixedPage | DEFINITION OF PAGE | Width : WIDTH OF PAGE<br>Height : HEIGHT OF PAGE<br>xml : lang : LANGUAGE IN USE<br>xmlns : XML NAME SPACE IN USE |
| Path | DEFINITION OF DRAWING DIAGRAM | Stroke : CONT LINE COLOR<br>Render Transform : ELEMENT OF COODINATES CONVERSION MATRIX |
| Path.Data | DEFINITION OF Path ELEMENT DIAGRAM DATA | — |
| PathGeometry | DEFINITION OF DIAGRAM DATA'S GEOMETRY | |
| PathFigure | DEFINITION OF SINGLE CLOSED CURVE | StartPoint : START POINT OF CLOSED CURVE |
| PolyLineSegment | DEFINITION OF SET OF LINES | Points : TERMINAL COODINATES OF RESPECTIVE LINES |
| PolyBezierSegment | DEFINITION OF BEZIER CURVE GROUP | Points : CONTROLLING POINT COODINATES OF RESPECTIVE BEZIER CURVES |
| PolyQuadraticBezierSegment | DEFINITION OF SECONDARY BEZIER CURVE GROUP | — |
| ArcSegment | DEFINITION OF OVAL ARC GROUP | — |

FIG. 7

| CONVERSION TARGET INSTRUCTION | CONVERSION PROCESSING |
|---|---|
| PolyBezierSegment | LINES APPROXIMATION |
| PolyQuadraticBezierSegment | LINES APPROXIMATION |
| ArcSegment | LINES APPROXIMATION |
| ... | ... |

FIG.10

```xml
<FixedPage Width="794" Height="1122" xml:lang="en-US"
    xmlns="http://schemas.microsoft.com/xps/2005/06" >
<Path Stroke="#000000">
  <Path.Data>
    <PathGeometry>
      <PathFigure StartPoint="0,100" >
        <PolyLineSegment Points="0,80"/>
<!-- XPS_ALTERNATIVE_ELEMENT
        <PolyLineSegment Points=" 1.935484, 81.752207, 3.870968, 83.153973, 5.806452, 84.229465
                                  7.741935, 85.002853, 9.677419, 85.498305, 11.612903, 85.739989
                                 13.548387, 85.752073, 15.483871, 85.558726, 17.419355, 85.184116
                                 19.354839, 84.652412, 21.290323, 83.987782, 23.225806, 83.214394
                                 25.161290, 82.356416, 27.096774, 81.438018, 29.032258, 80.483367
                                 30.967742, 79.516633, 32.903226, 78.561982, 34.838710, 77.643584
                                 36.774194, 76.785606, 38.709677, 76.012218, 40.645161, 75.347588
                                 42.580645, 74.815884, 44.516129, 74.441274, 46.451613, 74.247927
                                 48.387097, 74.260011, 50.322581, 74.501695, 52.258065, 74.997147
                                 54.193548, 75.770535, 56.129032, 76.846027, 58.064516, 78.247793
                                 60.000000, 80.000000 "/>
-->
        <PolyBezierSegment Points="20,100 40,60 60,80" />
        <PolyLineSegment Points="60,100 " />
<!-- XPS_ALTERNATIVE_ELEMENT
        <PolyLineSegment Points="58.064516, 56.129032, 96.846027, 54.193548, 95.770535
                                 52.258065, 50.322581, 94.501695, 48.387097, 94.260011
                                 46.451613, 44.516129, 94.441274, 42.580645, 94.815884
                                 40.645161, 38.709677, 96.012218, 30.967742, 96.785606
                                 34.838710, 32.903226, 98.561982, 30.967742, 99.516633
                                 29.032258, 27.096774, 101.43801, 25.161290, 102.35641
                                 23.225806, 21.290323, 103.98778, 19.354839, 104.65241
                                 17.419355, 15.483871, 105.55872, 13.548387, 105.75207
                                 11.612903, 9.677419, 105.49830, 7.741935, 105.00285
                                  5.806452, 3.870968, 103.15397, 1.935484, 101.75220
                                  0.000000, 100.00000 "/>
-->
        <PolyBezierSegment Points="40,80 20,120 0,100 " />
      </PolyFigure>
    </PathGeometry>
  </Path.Data>
</Path>
</FixedPage>
```

FIG.12

```
<FixedPage Width="794" Height="1122" xml:lang="en-US"
    xmlns="http://schemas.microsoft.com/xps/2005/06" >
<Path Stroke="#000000">
  <Path.Data>
    <PathGeometry>
      <PathFigure StartPoint="0,100" >
        <PolyLineSegment Points="0,80"/>
        <PolyLineSegment Points=" 1.935484,  81.752207,  3.870968, 83.153973,  5.806452, 84.229465
                                  7.741935,  85.002853,  9.677419, 85.498305, 11.612903, 85.739989
                                 13.548387,  85.752073, 15.483871, 85.558726, 17.419355, 85.184116
                                 19.354839,  84.652412, 21.290323, 83.987782, 23.225806, 83.214394
                                 25.161290,  82.356416, 27.096774, 81.438018, 29.032258, 80.483367
                                 30.967742,  79.516633, 32.903226, 78.561982, 34.838710, 77.643584
                                 36.774194,  76.785606, 38.709677, 76.012218, 40.645161, 75.347588
                                 42.580645,  74.815884, 44.516129, 74.441274, 46.451613, 74.247927
                                 48.387097,  74.260011, 50.322581, 74.501695, 52.258065, 74.997147
                                 54.193548,  75.770535, 56.129032, 76.846027, 58.064516, 78.247793
                                 60.000000,  80.000000 "/>
        <PolyLineSegment Points="60,100 "/>
        <PolyLineSegment Points="58.064516, 56.129032, 96.846027, 54.193548, 95.770535
                                 52.258065, 50.322581, 94.501695, 48.387097, 94.260011
                                 46.451613, 44.516129, 94.441274, 42.580645, 94.815884
                                 40.645161, 38.709677, 96.012218, 36.774194, 96.785606
                                 34.838710, 32.903226, 98.561982, 30.967742, 99.516633
                                 29.032258, 27.096774,101.43801, 25.161290,102.35641
                                 23.225806, 21.290323,103.98778, 19.354839,104.65241
                                 17.419355, 15.483871,105.55872, 13.548387,105.75207
                                 11.612903,  9.677419,105.49830,  7.741935,105.00285
                                  5.806452,  3.870968,103.15397,  1.935484,101.75220
                                  0.000000,100.00000 "/>
      </PathFigure>
    </PathGeometry>
  </Path.Data>
</Path>
</FixedPage>
```

FIG.16

```
<FixedPage Width="794" Height="1122" xml:lang="en-US"
    xmlns="http://schemas.microsoft.com/xps/2005/06" >
  <Path Stroke="#000000">
    <Path.Data>
      <PathGeometry>
        <PathFigure StartPoint="0,100" >
          <PolyLineSegment Points="0,80"/>
<!-- XPS_ALTERNATIVE_ELEMENT
          <PolyLineSegment Points=" 1.935484,  3.870968, 83.153973,  5.806452, 84.229465
                                    7.741935,  9.677419, 85.498305, 11.612903, 85.739989
                                   13.548387, 15.483871, 85.558726, 17.419355, 85.184116
                                   19.354839, 21.290323, 83.987782, 23.225806, 83.214394
                                   25.161290, 27.096774, 81.438018, 29.032258, 80.483367
                                   30.967742, 32.903226, 78.561982, 34.838710, 77.643584
                                   36.774194, 38.709677, 76.012218, 40.645161, 75.347588
                                   42.580645, 44.516129, 74.441274, 46.451613, 74.247927
                                   48.387097, 50.322581, 74.501695, 52.258065, 74.997147
                                   54.193548, 56.129032, 76.846027, 58.064516, 78.247793
                                   60.000000, 80.000000 "/>
          <PolyBezierSegmentPoints="20,100 40,60 60,80 " />
          <PolyLineSegment Points="60,100 " />
-->
<!-- XPS_ALTERNATIVE_ELEMENT
          <PolyLineSegment Points="58.064516, 56.129032, 96.846027, 54.193548, 95.770535
                                   52.258065, 50.322581, 94.501695, 48.387097, 94.260011
                                   46.451613, 44.516129, 94.441274, 42.580645, 94.815884
                                   40.645161, 38.709677, 96.012218, 36.774194, 96.785606
                                   34.838710, 32.903226, 98.561982, 30.967742, 99.516633
                                   29.032258, 27.096774, 101.43801, 25.161290, 102.35641
                                   23.225806, 21.290323, 103.98778, 19.354839, 104.65241
                                   17.419355, 15.483871, 105.55872, 13.548387, 105.75207
                                   11.612903,  9.677419, 105.49830,  7.741935, 105.00285
                                    5.806452,  3.870968, 103.15397,  1.935484, 101.75220
                                    0.000000, 100.00000 " />
          <PolyBezierSegmentPoints="40,80 20,120 0,100 " />
-->
        </PolyFigure>
      </PathGeometry>
    </Path.Data>
  </Path>
</FixedPage>
```

CounterA = 15
CounterB = 26

FIG.17

```
<FixedPage Width="794" Height="1122" xml:lang="en-US"
    xmlns="http://schemas.microsoft.com/xps/2005/06" >
<Path Stroke="#000000">
  <Path.Data>
    <PathGeometry>
      <PathFigure StartPoint="0,100" >
        <PolyLineSegment Points="0,80"/>
        <PolyBezierSegment Points="20,100 40,60 60,80" />
        <PolyLineSegment Points="60,100 " />
<!-- XPS_ALTERNATIVE_ELEMENT
        <PolyLineSegment Points=" 58.064516,   98.247793,   56.129032,   96.846027,   54.193548,   95.770535
                                  52.258065,   94.997147,   50.322581,   94.501695,   48.387097,   94.260011
                                  46.451613,   94.247927,   44.516129,   94.441274,   42.580645,   94.815884
                                  40.645161,   95.347588,   38.709677,   96.012218,   36.774194,   96.785606
                                  34.838710,   97.643584,   32.903226,   98.561982,   30.967742,   99.516633
                                  29.032258,  100.48336,    27.096774,  101.43801,    25.161290,  102.35641
                                  23.225806,  103.21439,    21.290323,  103.98778,    19.354839,  104.65241
                                  17.419355,  105.18411,    15.483871,  105.55872,    13.548387,  105.75207
                                  11.612903,  105.73998,     9.677419,  105.49830,     7.741935,  105.00285
                                   5.806452,  104.22946,     3.870968,  103.15397,     1.935484,  101.75220
                                   0.000000,  100.00000 " />
-->
        <PolyBezierSegment Points="40,80 20,120 0,100 " />
      </PathFigure>
    </PathGeometry>
  </Path.Data>
</Path>
</FixedPage>
```

CounterA = 15
CounterB = 13

METHOD AND APPARATUS FOR INCLUDING CONVERTED DRAWING COMMANDS IN A PRINT DATA FILE

BACKGROUND OF THE INVENTION

1. Field of the Invention

This invention relates to an image processing apparatus producing printing data, to an image forming apparatus, and a printing system.

2. Description of Related Art

Printers serving as image processing apparatuses perform printing process based on image data produced on an application program operating in a host computer as a host apparatus. One of methods for printing process has been known in which a host computer converts data to be transmitted into page description language (PDL) data or other intermediate language comparable to PDL, interpretable to a printer with the printer driver, in which the converted data is transmitted to the printer, and in which the printer expands the received data to be bitmap data to process printing based on the bitmap data (see generally, e.g., Japanese Unexamined Patent Publication No. 2005-301393).

Generally, in an image processing function owned by a printing apparatus, a PDL interpreter makes parsing processing or syntactic analysis on graphic objects described with PDL commands in the printing data, or entered data, and converts the data into a display list integrating graphic information required for the graphic objects from the parsed results. The bitmap images or the like, as data format that a printer engine mounted on the printing apparatus makes printing, are produced by a page rendering process producing a raster image (bitmap image) based on the converted display list.

Where the page description language data are transmitted to the printer from the host computer, the printer has to expand the data to, e.g., the bitmap data by processing the page description language data although a smaller amount of data makes the data transmission period shorter, and therefore, this expansion processing requires much more time, so that the printer has to operate for all processes with the system described above, so that the printing process frequently takes much time.

It is an object of the invention to provide an image processing apparatus realizing faster data processing in a case where image formation is made by transmitting data to an image forming apparatus such as, e.g., a printer. It is also another object of the invention to provide a printing system and an image forming apparatus performing communications with such an image processing apparatus.

SUMMARY OF THE INVENTION

The foregoing objects are accomplished with an image processing apparatus according to the invention, which includes: an editing unit for editing document data into description language data as description language interpretable to a terminal apparatus; a conversion table for converting a preset command; a description language data extracting unit for extracting a portion of the description language data as extracted data based on the conversion table; a converting unit for converting the extracted data to converted data based on the conversion table; a producing unit for producing transmission data by adding the converted data to the description language data; and a transmitting unit for transmitting the transmission data.

In another aspect of the invention, an image forming apparatus according to the invention includes: a receiving unit for receiving transmission data; a converted data extracting unit for extracting a portion of the transmission data as the extracted data; a replacing unit for replacing a corresponding portion of the transmission data with the extracted data to produce replaced data; an expanding unit for producing expanded data upon expansion process based on the replaced data; and a printing controlling unit for printing the expanded data.

In yet another aspect of the invention, a printing system according to the invention includes the image processing apparatus described above, and the image forming apparatus described above, wherein the converted data at the image processing apparatus are interpretable to the image forming apparatus.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 4 is a diagram showing an example of document data handled at the printing system according to the first embodiment of the invention;

FIG. 5 is a diagram showing data describing the document data in FIG. 4 in an XPS;

FIG. 6 is a table showing relation between the elements and attributes in the XPS;

FIG. 7 is a diagram showing an example of a conversion table used for the printer driver in the printing system according to the first embodiment of the invention;

FIG. 10 is a diagram showing an example of the processing result on a side of a host PC in the printing system according to the first embodiment of the invention;

FIG. 12 is a diagram showing an example of processing result on the side of the printer in the printing system according to the first embodiment of the invention;

FIG. 16 is a diagram showing a processing example on a side of a host PC in the printing system according to the second embodiment of the invention, where the PDL size exceeds a threshold value;

FIG. 17 is a diagram showing a situation that comments are removed from the example in FIG. 16.

DETAILED DESCRIPTION OF PREFERRED EMBODIMENTS

First Embodiment

Figure 1:
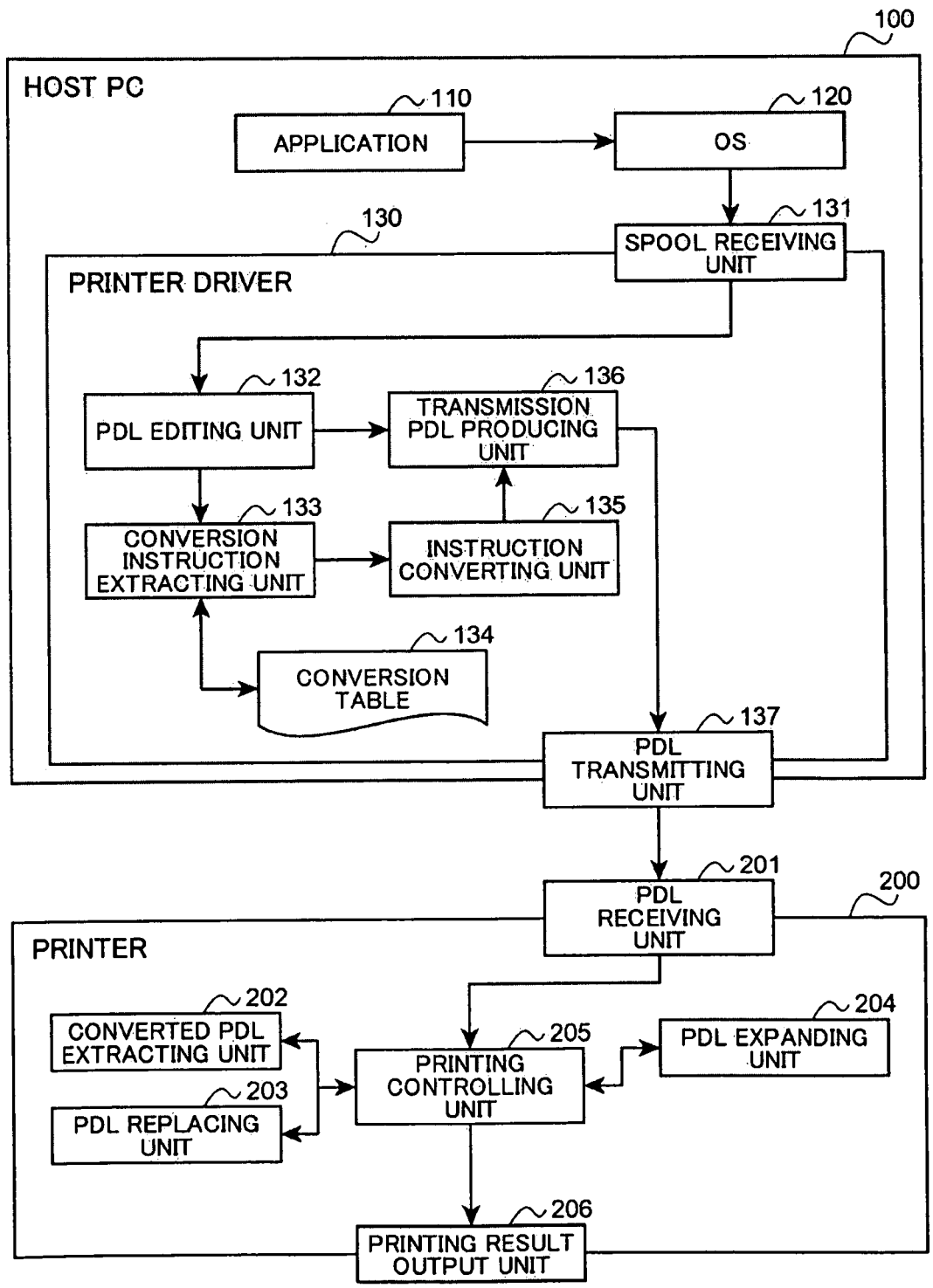
FIG. 1 is a block diagram showing an example of a printing system according to a first embodiment of the invention.

FIG. 1 is a block diagram showing a printing system according to the first embodiment of the invention. The printing system is constituted of a host PC (personal computer) 100 functioning as an image processing apparatus, and a printer 200 functioning as an image forming apparatus. The host PC 100 and the printer 200 are connected via a wiring means such as a printer cable or LAN (Local Area Network) or a wireless communication means.

The host PC 100 has an application 110 including a prescribed program or programs, an OS (Operation System) 120, and a printer driver 130, which are loaded from a storage device such as a hard disc to a main memorizing device, and are functioning as a signal processing means in response to a program or programs executed by a CPU (Central Processing Unit) not shown. The application 110 is a program for, e.g., productions, editions, viewings, printing instructions of documents and images, and is controllable by a user using an entry means such as a mouse and a keyboard, not shown. Where the application 110 designates, e.g., printing operation of document data, a spool file is made by OS 120, and the spool file is converted into PDL (Page Description Language) printable at the printer 200 by the printer driver 130 and sent to the printer 200.

The printer driver 130 includes a spool receiving unit 131 for receiving a spool file from OS 120, a PDL editing unit 132 for producing lines of PDL instructions forming PDL interpretable at the printer 200 from the received spool file, a conversion instruction extracting unit 133 for extracting PDL instructions convertible to other PDL instructions among the PDL instructions produced by the PDL editing unit 132, a conversion table 134 setting forth sets of the convertible PDL instructions referred by the conversion instruction extracting unit 133 and conversion processes, an instruction converting unit 135 for converting the extracted PDL instructions into other PDL instructions, a transmission PDL producing unit 136 for producing PDL instruction to be sent to the printer 200 upon adding the PDL instruction converted at the instruction converting unit 135 in a comment format to lines of the PDL instructions edited at the PDL editing unit 132, and a PDL transmitting unit 137 for transmitting the transmission PDL to the printer 200.

The PDL editing unit 132 has a function to select spool data as target for processing from spool data not yet processed with respect to data included in the spool file and to produce a first PDL instruction. The first PDL instruction is an instruction described in a format of XPL (XML Paper Specification) described above, and includes, e.g., an instruction for drawing a Bezier curve as it is. The conversion instruction extracting unit 133 has a function to extract a prescribed instruction to be converted into another instruction, and which instruction is to be extracted is determined upon referring to the conversion table 134. The conversion table 134 is a memorizing unit for memorizing sets of instructions to be converted, and selects and memorizes, as the instruction or instructions to be targeted for conversion, a set or sets of instructions which otherwise take a longer time to be processed on a side of the printing apparatus.

The instruction conversion unit 135 has a function to convert the instructions according to conversion patterns memorized in the conversion table 134, and for example, the instruction for drawing a Bezier curve is processed upon replacement with an instruction for drawing many straight lines. The transmission PDL producing unit 136 has a function to add a second PDL instruction and an identification flag indicating that the second PDL instruction is contained to the transmission PDL as in a comment format as described below. The transmission PDL producing unit 136 adds the identification flag and contents processed at the instruction converting unit 135 to the original first PDL instruction sent from the PDL editing unit 132. The contents processed for conversion at the instruction converting unit 135 at that time are added with a comment starting portion and a comment ending portion meaning for existence of a comment sentence at back and forth portions of the processed contents, and the transmission PDL is outputted in a state that the contents are not directly recognized at the subsequent apparatuses as any element of PDL on the appearance.

The printer 200 includes a PDL receiving unit 201 for receiving the PDL transmitted from the printer driver 130 of the host PC 100 as received PDL, a converted PDL extracting unit 202 for extracting the converted PDL as the PDL instruction converted by the instruction converting unit 135 from the comment contained in the received PDL, a PDL replacing unit 203 for replacing the converted PDL instruction with the original PDL instruction, a PDL expanding unit 204 for expanding the PDL instruction, a printing controlling unit 205 for controlling the converted PDL extracting unit 202, the PDL replacing unit 203, and the PDL expanding unit 204 and producing printing images, and a printing result output unit 206 for outputting printing results from the printing controlling unit 205.

The converted PDL extracting unit 202 has a function to extract the converted PDL serving as the PDL instruction converted by the instruction converting unit 135 from the comment contained in the received PDL when the identification flag indicating that the second PDL instruction is contained is contained. The converted PDL extracting unit 202 also has a function to extract the data between the comment starting portion and the comment ending portion which provide a meaning of the comment sentence as an instruction that has been converted. The PDL replacing unit 203 has a function to replace the original PDL instruction with the converted PDL instruction, and replaces the original instruction with the instruction extracted at the converted PDL extracting unit 202 and converted at the instruction converting unit 135. The PDL expanding unit 204 expands the transmitted PDL and the replaced PDL with the PDL replacing unit 203, and sends a signal for producing images formed at the printing controlling unit 205 made of a CPU. The printing result output unit 206 is a printing mechanism section of, e.g., an electorophotographic method, having an exposure device and a developing device placed around an image carrier made of, e.g., a photosensitive drum, and having a mechanism to transfer toner to fed paper and settling the toner thereon.

The printing system according to the invention uses XPS (product name) made of Microsoft Corp as an example of PDL. Where Vista (product name) of Windows (registered trademark) or like is installed as the operation system in the host PC 100, the XPS document format is used, and the XPS can be used as a document format for printers, as a Windows spool file format, and a page description language (PDL). With the XPS, the XML (extensible Markup Language) is adapted for definitions of elements structuring pages. The XML, as widely known, is a language able to describe a stratified structure by combinations of the plural elements and attributes, and in the XPS, the element corresponds to a drawing instruction while the attribute corresponds to a parameter for drawing instruction. The actual XPS has a structure in packaging plural files such as, e.g., markup data describing page contents, resource data such as fonts and images, and meta data describing relations between pages in documents. With this invention, processing on the markup data is particularly important, and the XPS markup is hereinafter described as the same meaning as PDL.

Referring to FIGS. 4, 5, relation between document data and the XPS markup is described. FIG. 4 shows an example of document data handled at the application 110 of the host PC 100, and shows a diagram made of a pair of straight lines extended vertically and a pair of Bezier curves. FIG. 5 shows the contents described with the XPS markup corresponding to the document data containing the diagram shown in FIG. 4. As shown in FIG. 5, with the XPS markup, the element of "PolyLineSegement Points=..." is described in corresponding to the pair of straight lines, and the element of "PolyBezierSegment Points=..." is described in corresponding to the pair of Bezier curves. Conversion from such a document data to the XPS markup is done in accordance with the printing instruction from the user at the PDL editing unit 132 of the printer driver 130 as described below.

The elements and attributes of the XPS used in this embodiment are described in referring to FIG. 6. In the XPS, a set or sets of respective instructions of the elements and attributes are structured to make the data from the printing contents, and as shown in FIG. 6, for example, the PDL for documents to be printed is formed upon selecting the element and the attribute corresponding to the element. In FIG. 6, "FixedPage, Path, PathData, PathGeometry, PathFigure, PolyLineSegment, PolyBezierSegment, PolyQuadraticBeizerSegment, and ArcSegment" are exemplified as elements, but those are only a part of elements forming the printing data, and the elements used actually cannot be restricted to those elements.

Figure 2:
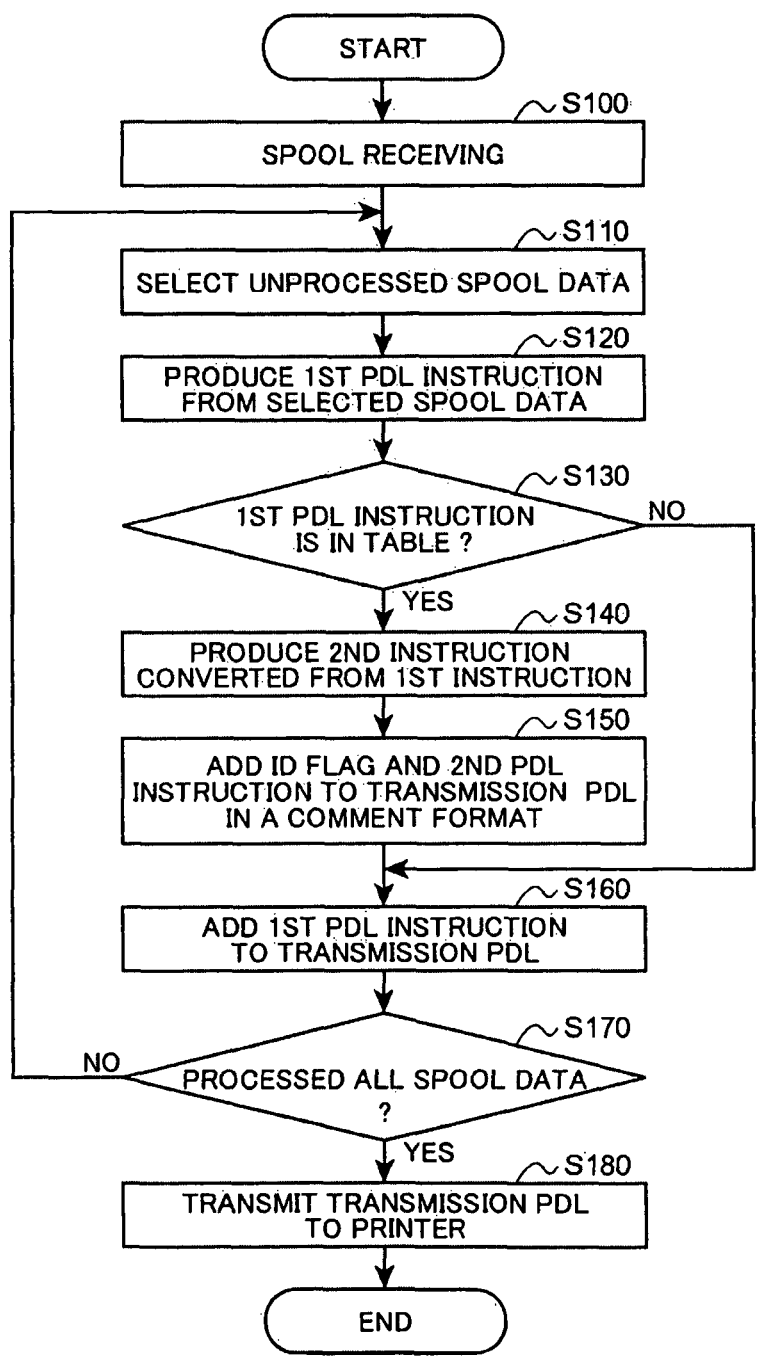
FIG. 2 is a printer driver in the printing system according to the first embodiment of the invention.

In operation of the host 100 and the printer 200 according to the embodiment, first, the operation of the printer driver 130 in the host PC 100 is described in referring to FIG. 2. FIG. 2 is a flowchart showing operation when the printer driver 130 processes a spool file at the host PC 100.

First, a user manipulates the application 110 as to execute printing operation upon manipulating a mouse and a keyboard, not shown, thereby rendering the spool receiving unit 131 receive a spool file from the OS 120 (step S100).

Figure 8:
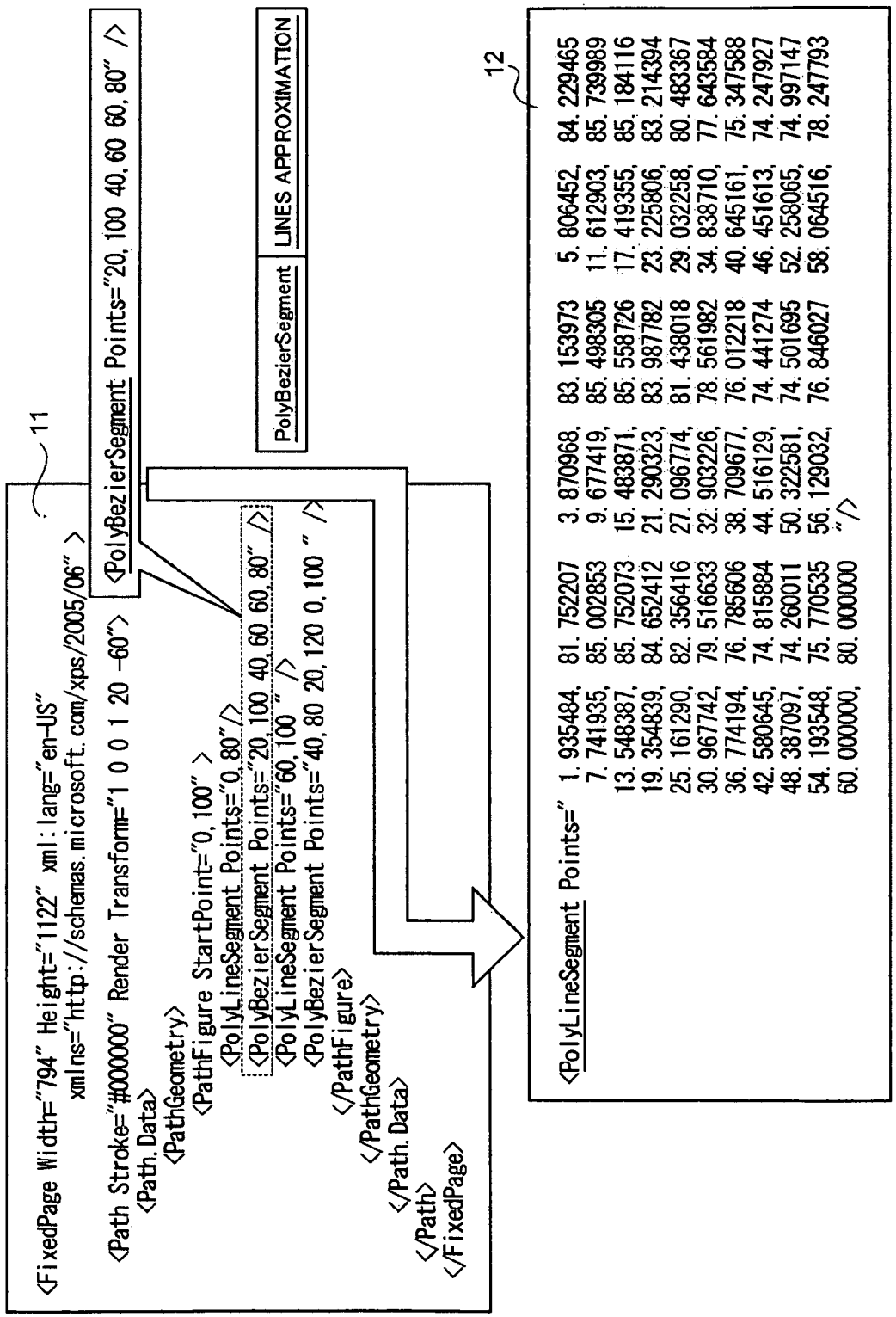
FIG. 8 is a diagram showing a converted example of PDL instruction in the printing system according to the first embodiment of the invention.

A spool data as a target to be processed is selected at the PDL editing unit 132 from the not yet processed spool data with respect to the data contained in the spool file (step S110), and the first PDL instruction is produced at step S120. At that time, in a case of, e.g., a document containing drawing of the diagram surrounded with the pair of Bezier curves and the pair of straight lines as shown above in FIG. 4, a set of first PDL instructions as a screen 11 shown in FIG. 8 is produced. The PDL instruction includes the same set of instructions as the set of instructions shown in FIG. 5, and the element of "PolyLineSegement Points=..." is described in corresponding to the pair of straight lines, and the element of "PolyBezierSegment Points=..." is described in corresponding to the pair of Bezier curves.

The PDL editing unit 132 is controlled to proceed with the processing of each PDL instruction, and if the first PDL instruction is notified from the PDL editing unit 132 to the conversion instruction extracting unit 133, the conversion instruction extracting unit 133 makes a reference to the first PDL instruction with the contents of the conversion table 134 (step S130). If the first PDL instruction exists in the conversion table 134, a second PDL instruction is produced by the instruction converting unit 135 upon converting the first PDL instruction according to the contents described in the conversion table 134 (step S140).

An example of the conversion table is shown in FIG. 7. The first column of the conversion table indicates PDL instruction as instruction targeted to be converted, which is subject to conversion, and the second column indicates the conversion process. For example, the XPS markup in FIG. 8 includes the instruction PolyBezierSegment for drawing Bezier curves, and in such a case, the instruction is converted to PolyLineSegment for linear approximation as an instruction for drawing lines according to the first row in FIG. 7. This conversion is executed with the instruction converting unit 135 of the printer driver 130, and for example, the instruction is converted into a PDL instruction of PolyLineSegment made in combination of plural lines including sixty two attribute data as shown in a screen 12 shown in FIG. 8. The conversion from the instruction of PolyBezierSegment to the instruction of PolyLineSegment is defined as the conversion from the first PDL instruction to the second PDL instruction. Although resources at the instruction converting unit 135 of the host PC 100 are used for this conversion processing from Bezier curves to plural straight lines, the side of the host PC 100 can generally make processing with a faster operation rate than that of the side of the printer 200, so that the system can process with a high speed in comparison with the process done at the side of the printer.

Figure 9:
FIG. 9 is a diagram showing a converted example into a comment format in the printing system according to the first embodiment of the invention.

Subsequently, the transmission PDL producing unit 136 adds the second PDL instruction and the identification flag to the transmission PDL instruction. Particularly, the second PDL instruction produced at the instruction conversion unit 135 and the identification flag indicating that the second PDL instruction is contained are added to the transmission PDL as in the form of the comment format at the transmission PDL producing unit 136 (step S150). The example converted to the comment format is shown in FIG. 9. In the XPS, a portion sandwiched by the comment starting portion "<!—" and the comment ending portion "→" is deemed as a comment. Accordingly, as shown with a screen 13 in FIG. 9, a prescribed string (XPS_ALTERNATIVE_ELEMENT) is added to a head portion of the comment to function as the identification flag, and the converted second PDL instruction is disposed subsequently to the identification flag in the same comment sentence. The identification flag can be any form as far as recognizable as that a PDL instruction in the comment is a second PDL instruction, and can be other forms or strings.

Regardless the reference result (step S130), or namely regardless production or not of the second PDL instruction, the first PDL instruction is added to the transmission PDL by the transmission PDL producing unit 136 (step S160). Because the second PDL instruction is inserted in the comment format, the format is not recognized generally as that any of the PDL instruction itself is particularly inserted when viewed as the markup language. Therefore, even in a case where printing operation is executed with a printer not corresponding to a high speed process with the second PDL instruction, the data are processed as data made of the first PDL instruction as they are, so that the printing system ensures compatibility to various printers.

If there are any unprocessed data, the processing for spool data is repeated (step S170). If the entire spool data are processed, the PDL transmitting unit 137 transmits the transmission PDL to the printer 200 (step S180). FIG. 10 shows a transmission PDL obtained as a result of processing of the PDL instruction in the screen 11 in FIG. 8 based on the flow above. The PDL instruction shown in FIG. 10 is an example of PDL instruction finally outputted from the host PC 100, and is an example in a situation that the respective instructions in the screen 11 in FIG. 8 are processed. The group of the first PDL instructions contains an instruction of PolyBezierSegemnt corresponding to Bezier curves at two locations, and it turns out that the identification flag and the second PDL instruction are inserted in the comment format at each portion immediately before the two locations. In this embodiment, the data are made into this format containing such second PDL instructions at a stage that the data are transmitted from the host PC 100.

Figure 3:
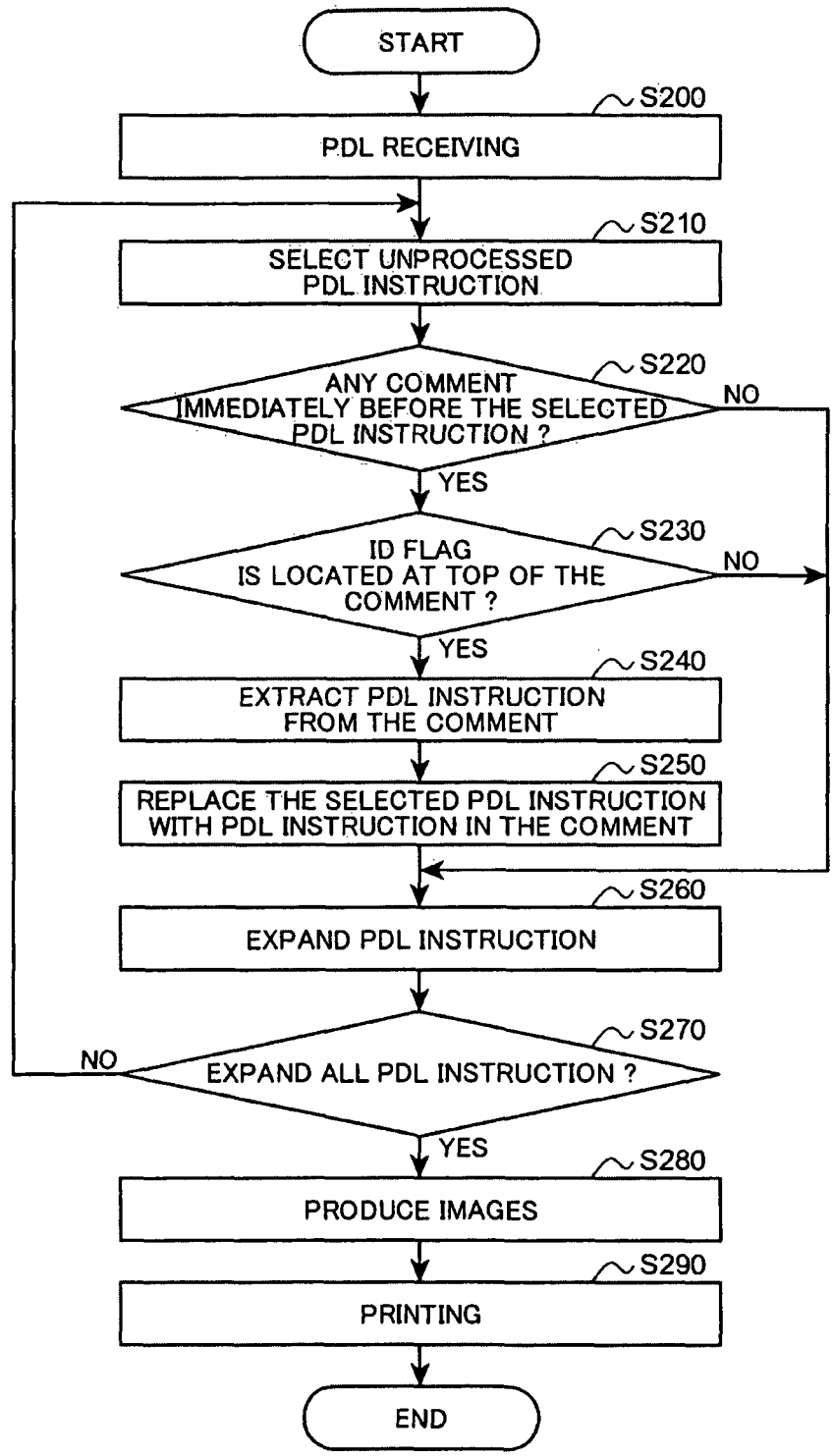
FIG. 3 is a flowchart illustrating operation of the printer in the printing system according to the first embodiment of the invention.

Next, operation on a side of the printer 200 according to this embodiment is described. FIG. 3 is a flowchart describing the operation when the printer 200 makes printing.

When printing is made, the PDL from the host PC 100 is received at the PDL receiving unit 201 (step S200). A not yet processed PDL instruction or instructions are selected at step S210, and the system confirms as to whether any comment is contained immediately before the selected PDL instruction (step S220). As a result of the confirmation, if no comment is contained immediately before the selected PDL instruction, the program proceeds to step S260 as no conversion to the second PDL instruction is made. As a result of the confirmation as to whether any comment is contained immediately before the selected PDL instruction at step S220, if a comment exists, a confirmation is subsequently made as to whether any identification flag exists in the comment at step 230.

Figure 11:
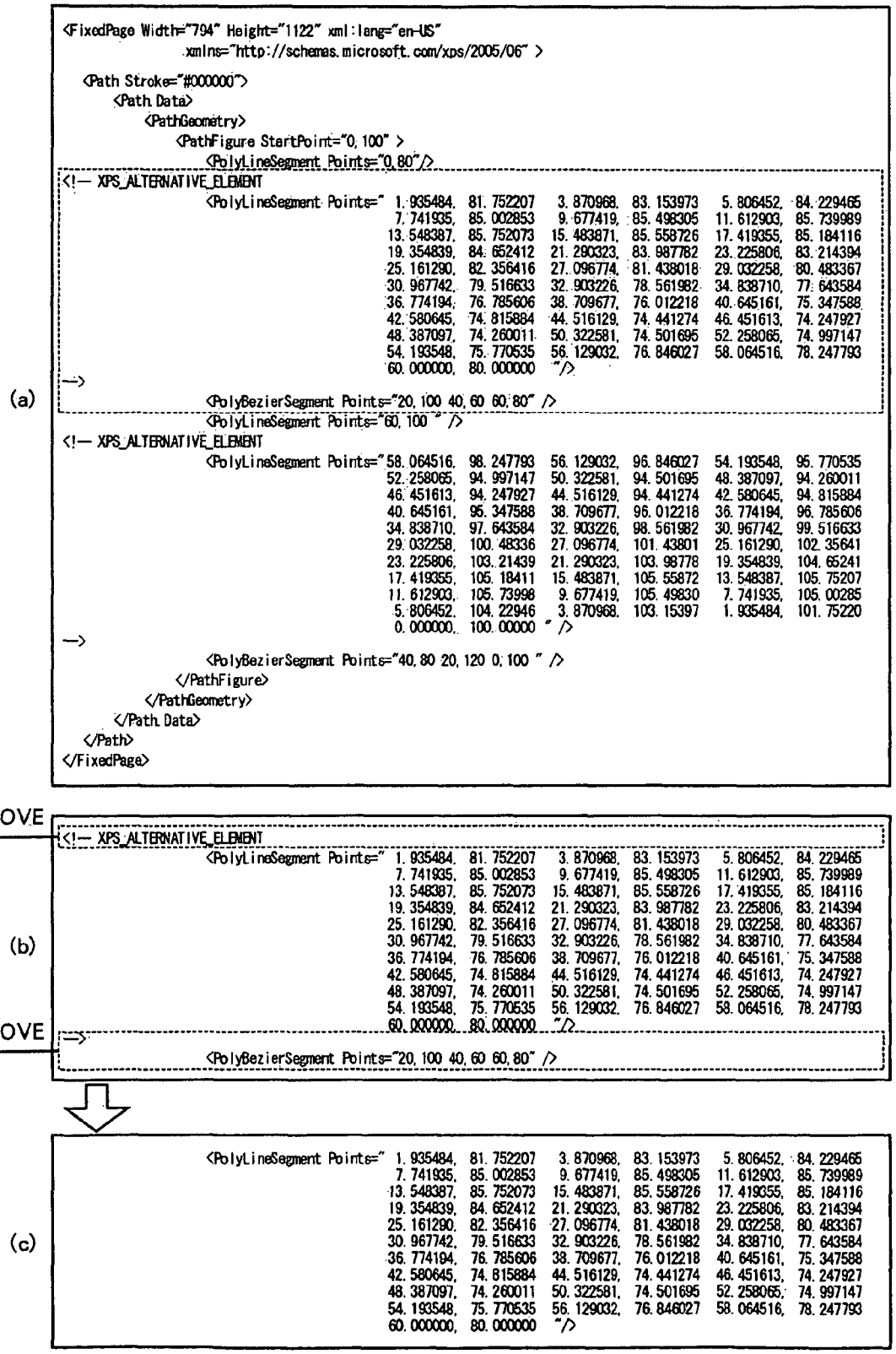
FIG. 11 is a diagram showing an example of conversion operation of PDL instruction on a side of the printer in the printing system according to the first embodiment of the invention.

If no identification flag exists in the comment, it is judged as the comment sentence is not related to the conversion process at step S230, and the program proceeds to step S260. On the other hand, if a comment including the identification flag exists, replacement of the PDL instruction is made according to the following steps. First, the PDL instruction contained in the comment is extracted with the conversion PDL instruction extracting unit 202 at step S240. In operation at that time, referring to FIG. 11, the data transmitted has the comment sentence or portion immediately before the instruction of PolyBezierSegment as shown as (a), and has a string XPS_ALTERNATIVE_ELEMENT serving as the identification flag. This comment sentence is extracted as (b) in FIG. 11, and the comment tags ("<!—" and "→"), the identification flag ("XPS_ALTERNATIVE_ELEMENT"), and the first PDL instruction ("PolyBezierSegment instruction" in this example) as the basis of the conversion are removed. Those extraction jobs of the PDL instructions are executed at the conversion PDL extracting unit 202. By removing the comment tags, the identification flag, the first PDL instruction as the basis of the conversion, a PDL instruction of PolyLineSegment as shown with (c) in FIG. 11 is obtained.

The PDL replacing unit 203 then replaces the PDL instruction extracted at the conversion PDL instruction extracting unit 202 with PDL instruction selected at step S210 (step S250). FIG. 12 shows an example of a result of the PDL instruction finally processed for replacement, and the comment tags and the identification flag are removed, no instruction of PolyBezierSegment as the basis of the conversion exists. It is in a form that the PDL instruction of PolyLineSegment is inserted to the location at which the instruction of PolyBezierSegment had existed. The PDL shown in FIG. 12 becomes the data to be expanded actually.

The PDL expanding unit 204 subsequently expands the PDL instruction selected at step S210 and the PDL instruction replaced at step S250 (step S260). If any PDL instruction is not expanded, the process is repeated at step S270, and if expansion of all PDL instructions is completed, the printing controlling unit 205 produces images (step S280). Printing processing ends upon outputting the produced images from the printing result output unit 206 (step S290).

Figure 13:
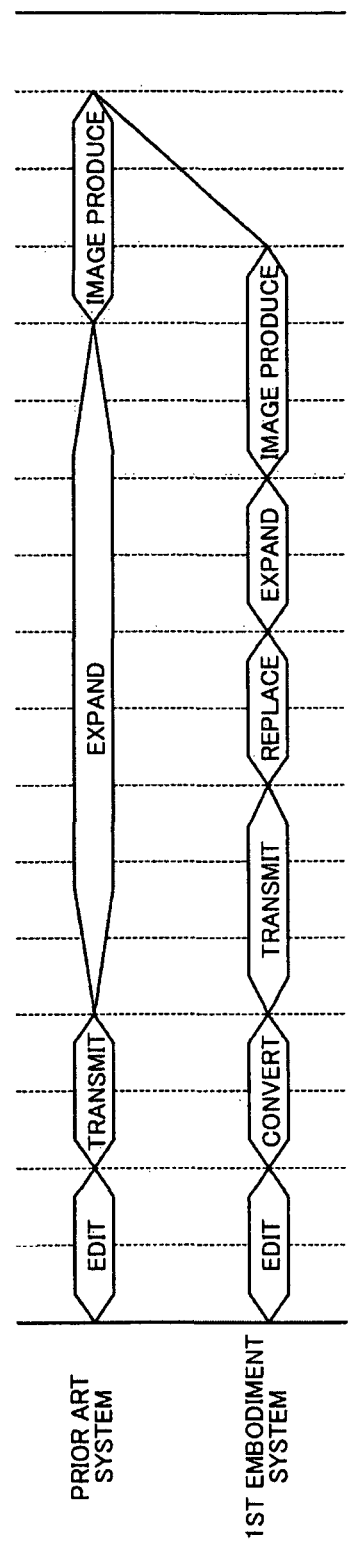
FIG. 13 is a time chart comparing processing times by operations of a conventional printing system and the printing system according to the first embodiment of the invention, respectively.

FIG. 13 shows a time chart illustrating specific advantages. With the printing system of the embodiment, it is required to have the conversion process at the drive printer 130 and the replacement process at the printer 200 as extra, and the transmission time to the printer 200 may be longer because of increase of the data amount due to the added comments. However, by adequately shortening the expansion process at the printer 200 in comparison with that in the prior art printing system, the whole processing time can be shortened in comparison with the prior art system.

As described above, according to the first embodiment, the system can enjoy an advantage to shorten the processing time on the printer by converting, on the host PC 100, complicated instructions such as, e.g., drawing Bezier curves into simpler instructions of drawing straight lines. Even in a case that the instructions are converted into PDL instructions optimized to specific printers in a way such that features such as, e.g., definition of the apparatus greatly affect to obtain a proper drawing result where a Bezier curve is drawn with straight lines, there will be no disadvantage to interpret the original PDL instruction even where operating with a not anticipated combination of a printer driver and a printer, because the instruction is added as the comment.

Second Embodiment

Figure 14:
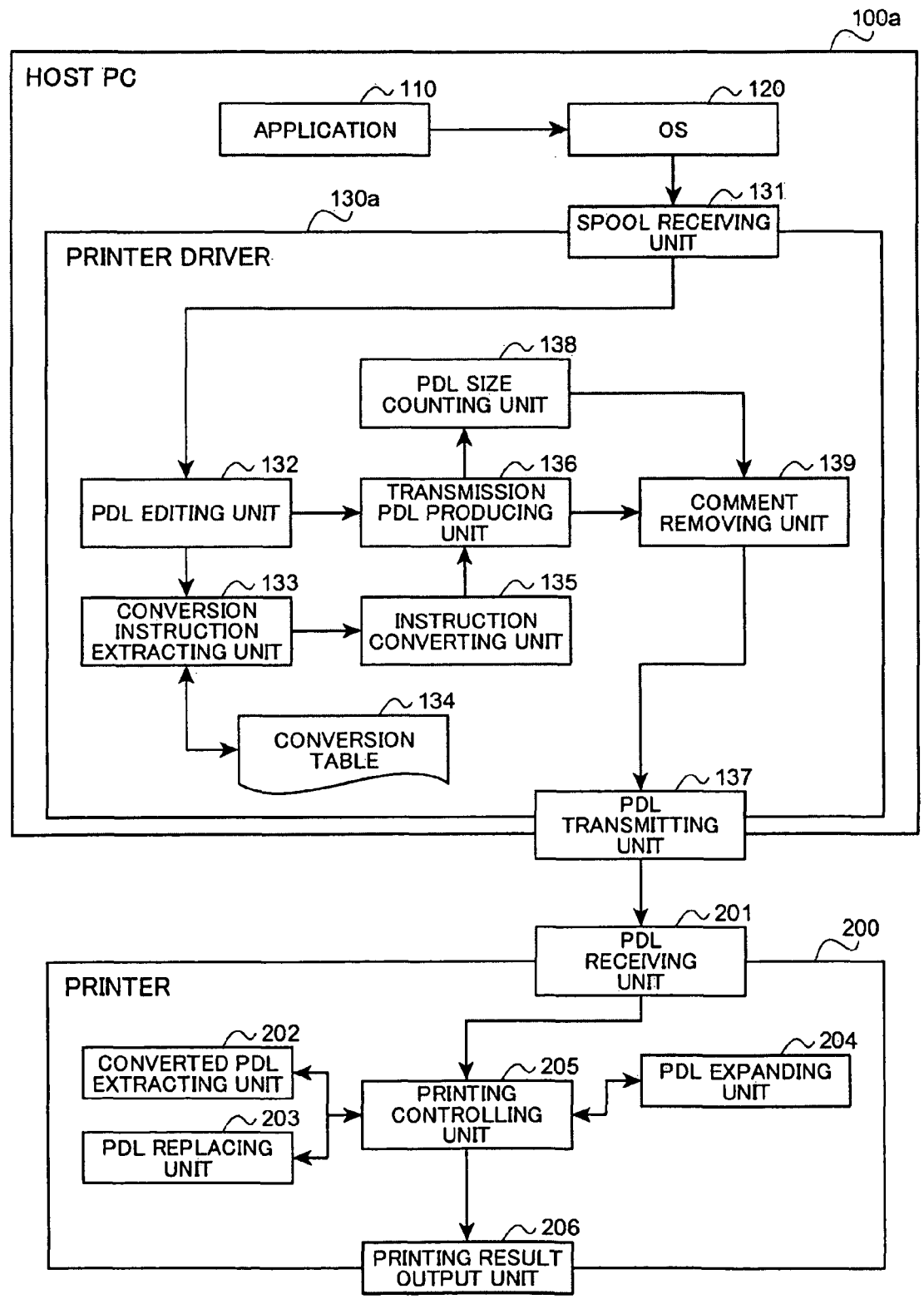
FIG. 14 is a block diagram showing an example of a printing system according to a second embodiment of the invention.

FIG. 14 is a block diagram showing a printing system according to the second embodiment of the invention. The structure in this embodiment is that a PDL size counting unit 138 and a comment removing unit 139 are added to the printer driver 130 in the first embodiment, and other structural elements including the printer 200 are substantially the same as those in the first embodiment.

For the sake of simplicity, the different portions from the first embodiment are described. The PDL size counting unit 138 of the printer driver 130a of the host PC 100a has a function to record the total size of the PDL instructions edited by the PDL editing unit 132 and the comment converted and added by the instruction converting unit 135. The result of the total size recorded at the PDL size counting unit 138 is sent to the comment removing unit 139. The comment removing unit 139 removes comments from the transmission PDL based on the result from the PDL size counting unit 138. That is, if the total size of the comments recorded at the PDL size counting unit 138 exceeds a certain value, addition of comments may not be advantageous, and the comment removing unit 139 removes the comments. More specifically, the PDL size counting unit 138 includes a Counter B accumulating the total size of the added comments, and a Counter A accumulating the total size of the added first PDL instructions, and further memorizes a prescribed value such as, e.g., 1.5 as a threshold value. The PDL size counting unit 138 is formed to compare a value in which the value of the Counter B is divided by the value of the Counter A with the threshold value in the operation flow, and if the size of the second PDL instructions becomes large, the PDL size counting unit 138 operates to remove the added comments.

Figure 15:
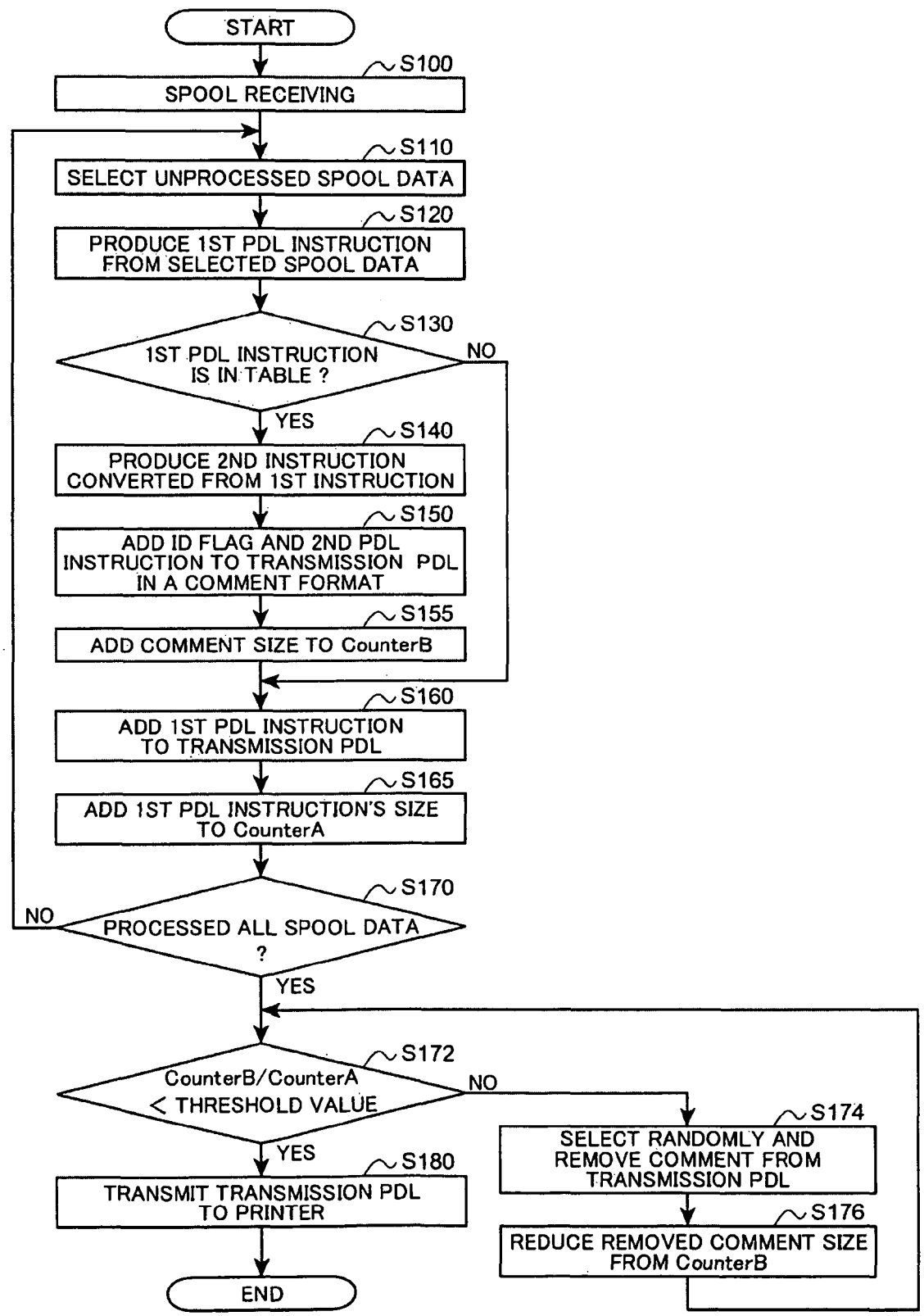
FIG. 15 is a flowchart illustrating operation of a printer driver in the printing system according to the second embodiment of the invention.

Referring to operation flow of the printer driver as shown in FIG. 15, the operation of the printing system according to this embodiment is described in detail. The operation of this embodiment is done in a way that the operation of printer driver in the first embodiment is added with some operations. That is, the operations at steps S155, S165, S172, S174, and S176 are added. The following description is for those operations, respectively.

If it is judged as that the first PDL instruction is to be converted, the transmission PDL producing unit 136 adds a comment to the transmission PDL, and the size is added to the Counter B as a memory region in the PDL size counting unit 138 (step S155).

Similarly, if the first PDL instruction is added to the transmission PDL instruction, the size is added to the Counter A as a memory region in the PDL size counting unit 138 (step S165). FIG. 16 shows the value of the Counter A (=15) and the value of the Counter B (=26) in the transmission PDL instruction as shown above in FIG. 10. Here, the line number is used as the size to be added, the number of letters, words, and bytes can be used.

The PDL size counting unit 138 compares the ratio of the Counter B to the Counter A with the prescribed threshold value before the transmission PDL is sent to the printer 200 (at step S172), and if the ratio is equal to or greater than the threshold value, the comments are randomly selected from the transmission PDL instruction, and the selected ones are removed (step S174), so that the size of the removed comments is reflected to the Counter B (step S176). For example, if the value 1.5 is adapted as the threshold value, the ratio of the Counter B to the Counter A (CounterB/CounterA) is equal to 26/15=1.73, which is greater than the threshold value of 1.5, and because the ratio exceeds the threshold value, the comments are required to be removed.

If the first comment (having data of thirteen lines) in FIG. 16 is selected and removed, the data becomes as shown in FIG. 17. At that time, the ratio of the Counter B to the Counter A is equal to 13/15=0.87, which is less than the threshold value of 1.5, and therefore, no further comment is removed from the transmission PDL, which is transmitted to the printer 200.

As described above, in the second embodiment, if the size of the transmission PDL becomes larger than the threshold value, the comments are removed to reduce the size, so that the entire processing time can be shortened even in a situation that the transmission time becomes longer due to affection of the transmission PDL's size as in the first embodiment.

Figure 18:
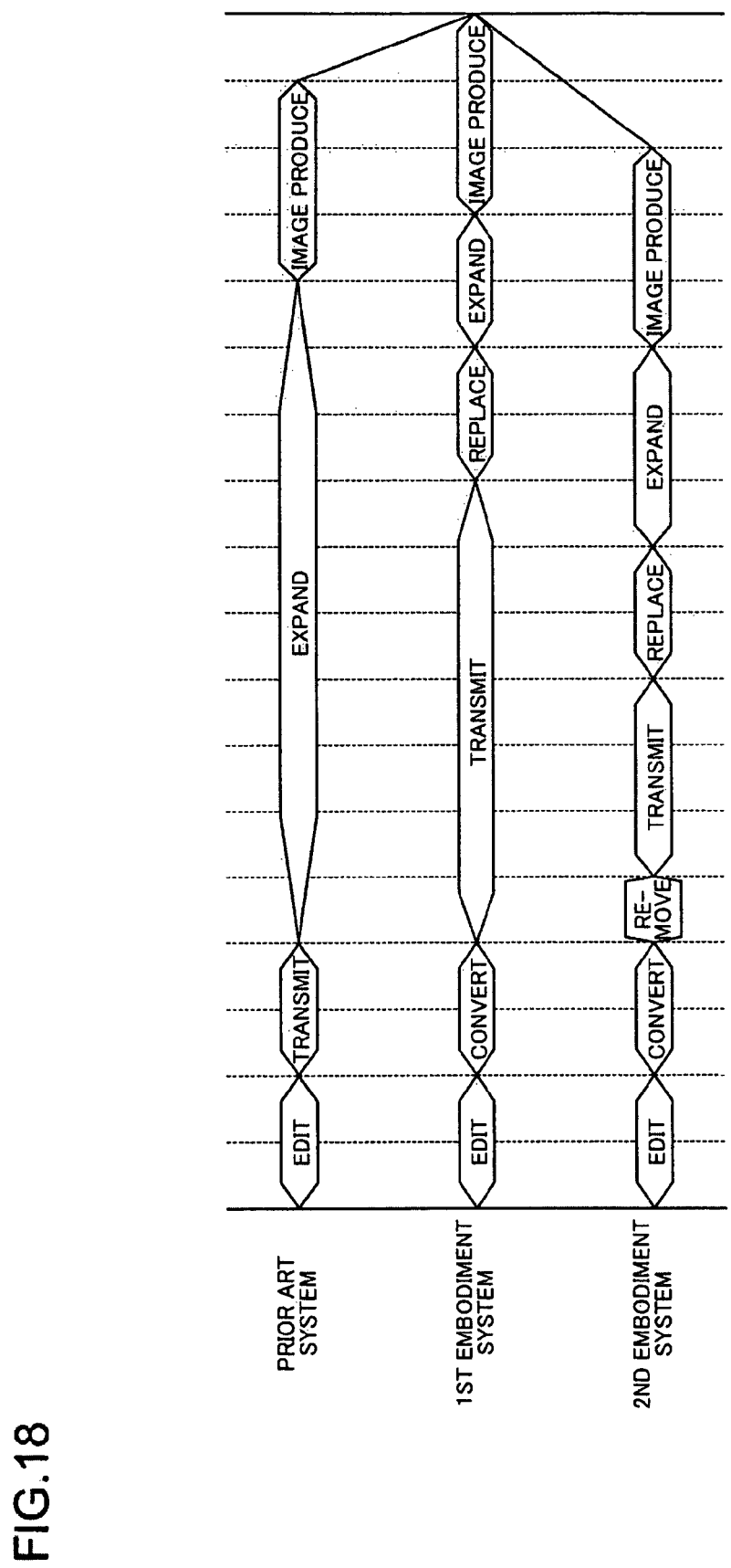
FIG. 18 is a time chart comparing processing times by operations of a conventional printing system and the printing system according to the first and second embodiments of the invention, respectively.

FIG. 18 shows a time chart illustrating specific advantages. With the first embodiment, if the size of the transmission PDL increases, the transmission time becomes longer, and consequently, the total processing time may be more than that of the prior art system. In such a situation, with the second embodiment, the entire processing time can be shortened by reducing the transmission time even though the necessary time for a process for removing comments and the necessary time for a process for expansion are increased.

Although in the above first, second embodiments, an example in which the invention is applied to printers, the invention is applicable to photocopiers, facsimile machines, and multi-functional peripherals. The host PC can be other electrical devices such as, e.g., digital cameras, cellar phones, and PDAs (Personal Digital Assistants). Although in the above first, second embodiments the XPS is described for PDL, this invention is applicable to PDL having comment functions such as Postscript or the like. This invention is further applicable to not only PDL but also other description languages as a matter of course.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image processing apparatus comprising:
   an editing unit configured to edit document data into first description language data as description language interpretable to a terminal apparatus;
   a conversion table configured to store a preset command corresponding to a prescribed conversion process;
   a description language data extracting unit configured to extract the command that is a portion of the first description language data as extracted data based on the conversion table;
   a converting unit configured to convert the portion of the first description language data to second description language data;
   a producing unit configured to produce transmission data, the transmission data containing (i) data in a first description language format, and (ii) the second description language data to which the portion of the first description language data is converted;
   a transmitting unit configured to transmit the transmission data
   a counting unit configured to record a data size indicating an amount of data included in the transmission data; and
   a removing unit configured to remove a part of the added converted data based on the data size,
   wherein the counting unit records a data size of the second description language data indicating a data amount of the second description language data and a data size of the description language indicating a data amount of the first description language data, and
   wherein the removing unit removes the part of the added second description language data based on a ratio of the data size of the second description language data with respect to the data size of the first description language data.

2. The image processing apparatus according to claim 1, wherein the producing unit adds the second description language data in a comment format to the first description language data.

3. The image processing apparatus according to claim 2, wherein the comment format includes a flag for identifying the second description language data.

4. The image processing apparatus according to claim 1, wherein the first description language data are page description language printable at a printer.

5. The image processing apparatus according to claim 1, wherein the description language data extracting unit extracts a not yet processed portion of the first description language data.

6. The image processing apparatus according to claim 1, wherein the converting unit converts the extracted data including an instruction depicting a Bezier curve into the second description language data including an instruction depicting plural straight lines.

7. A printing system comprising the image processing apparatus according to claim 1, and an image forming apparatus comprising:
- a receiving unit for receiving transmission data;
- a converted data extracting unit for extracting a portion of the transmission data as the extracted data;
- a replacing unit for replacing a corresponding portion of the transmission data with the extracted data to produce replaced data;
- an expanding unit for producing expanded data upon expansion process based on the replaced data; and
- a printing controlling unit for printing the expanded data,
- wherein the second description language data at the image processing apparatus are interpretable to the image forming apparatus.

8. The printing system according to claim 7, wherein the second description language data are in a comment format.

9. The printing system according to claim 8, wherein the comment format includes a flag for identifying the second description language data.

10. The printing system according to claim 7, wherein the second description language data extracting unit extracts the portion in a comment format of the transmission data.

11. The printing system according to claim 7, wherein the second description language data extracting unit removes comment tags and a flag for identifying the second description language data from the extracted data.

\* \* \* \* \*